US012589954B2

(12) United States Patent
Senger et al.

(10) Patent No.: US 12,589,954 B2
(45) Date of Patent: Mar. 31, 2026

(54) LOAD FORMING SYSTEM SHIFTABLE BETWEEN AUTOMATIC AND WORKER-ASSISTED CONFIGURATIONS

(71) Applicant: A. G. Stacker Inc., Weyers Cave, VA (US)

(72) Inventors: Randall Donn Senger, Mount Sidney, VA (US); Jerry Blosser, Crimora, VA (US); Eric Stempihar, Rockingham, VA (US)

(73) Assignee: A. G. Stacker Inc., Weyers Cave, VA (US)

( * ) Notice: Subject to any disclaimer, the term of this patent is extended or adjusted under 35 U.S.C. 154(b) by 106 days.

(21) Appl. No.: 18/817,319

(22) Filed: Aug. 28, 2024

(65) Prior Publication Data

US 2026/0062237 A1 Mar. 5, 2026

(51) Int. Cl.
| | |
|---|---|
| *B65G 57/112* | (2006.01) |
| *B65G 15/62* | (2006.01) |
| *B65G 47/82* | (2006.01) |
| *B65G 51/03* | (2006.01) |
| *B65G 57/03* | (2006.01) |

(52) U.S. Cl.
CPC ............ *B65G 57/112* (2013.01); *B65G 15/62* (2013.01); *B65G 47/82* (2013.01); *B65G 51/03* (2013.01); *B65G 57/03* (2013.01); *B65G 2201/022* (2013.01)

(58) Field of Classification Search
None
See application file for complete search history.

(56) References Cited

U.S. PATENT DOCUMENTS

| | | | | |
|---|---|---|---|---|
| 4,271,755 A | * | 6/1981 | Kintgen | B65G 57/245 100/52 |
| 4,599,025 A | * | 7/1986 | Borsuk | B65G 57/06 198/468.9 |
| 5,567,113 A | * | 10/1996 | Mumper | B65G 57/035 414/794.3 |
| 5,641,052 A | * | 6/1997 | Lazzarotti | B65G 47/31 198/360 |
| 5,716,189 A | * | 2/1998 | Winski | B65G 47/086 414/800 |
| 5,842,827 A | * | 12/1998 | Kwasniewski | B65G 57/245 414/794.3 |

(Continued)

*Primary Examiner* — Gene O Crawford
*Assistant Examiner* — Muhammad Awais
(74) *Attorney, Agent, or Firm* — J-TEK LAW PLLC; Jeffrey D. Tekanic; Scott T. Wakeman

(57) ABSTRACT

A load forming system includes a feed conveyor, a load former, a transfer platform and a shifter having a contact body and an actuator for moving the contact body toward and away from the load former to shift objects from the transfer platform onto the load former. The shifter has an enabled state in which the actuator can move the contact body, and a disabled state in which movement of the contact body is prevented. The transfer platform includes a first section and a second section hingedly connected to the first section. In an automated configuration the second section is raised and the shifter is enabled and a guard is mounted at the second edge of the second section, and in a worker-assisted configuration the second section is lowered and the shifter is disabled.

17 Claims, 15 Drawing Sheets

(56)  References Cited

U.S. PATENT DOCUMENTS

| | | | | |
|---|---|---|---|---|
| 6,220,420 B1 * | 4/2001 | Jan | ...................... | B65G 47/268 |
| | | | | 198/463.3 |
| 7,753,357 B2 * | 7/2010 | Allen, Jr. | ............... | B65H 29/16 |
| | | | | 271/69 |
| 7,954,628 B2 * | 6/2011 | Allen, Jr. | ............... | B65G 51/32 |
| | | | | 198/801 |
| 9,731,924 B2 * | 8/2017 | Allen, Jr. | ............... | B65H 29/50 |
| 9,764,909 B2 * | 9/2017 | Baumann | ............... | B65G 57/06 |
| 10,589,953 B2 * | 3/2020 | Allen, Jr. | ............... | B65H 29/16 |
| 10,850,933 B1 * | 12/2020 | Allen, Jr. | ............... | B65H 29/34 |

* cited by examiner

LOAD FORMING SYSTEM SHIFTABLE BETWEEN AUTOMATIC AND WORKER-ASSISTED CONFIGURATIONS

TECHNOLOGICAL FIELD

The present disclosure is directed to a load forming system that can be shifted between a fully automated operating state and a worker-assisted operating state in which a worker performs some functions that are performed automatically in the fully automated operating state.

BACKGROUND

Load formers are machines used to form stacks of objects which stacks have multiple layers of the objects. While load formers can be used in many industries, one field in which load formers are commonly found is the processing of sheets of corrugated paperboard, and the present disclosure will be discussed primarily in connection with this use.

Paperboard may be processed as follows on its way to a load former. A web (or individual web segments) of corrugated paperboard is fed through a rotary die cut machine that cuts the web or web segments into a desired shape. The output of the rotary die cut machine may be individual sheets each of which includes a connected series of blanks. Each of the blanks may, for example, be configured to be folded into a paperboard box. These sheets are transported to a stacker which forms stacks of the sheets having a predetermined height. Such stacks of sheets of interconnected blanks may be referred to as a "logs." Logs are processed by a machine known as a bundle breaker to break stacks of individual blanks off the log. A vertical stack of individual sheets after it has been broken off the log may be referred to as a "bundle."

Before bundles are moved to storage or to an end customer it is generally desirable to arrange them on a pallet. This can be done manually by a worker taking bundles one at a time and placing them in a pattern on a pallet and then stacking layer after layer of the bundles until a finished stack is formed on the pallet. However, this process can be done more efficiently and consistently by using a machine known as a "load former." An example of a load former is shown in U.S. Pat. No. 10,850,933, which is assigned to the present applicant and is hereby incorporated by reference.

In a worker-assisted method that includes a load former, bundles are transported by conveyor to a location near the load former from which location a worker removes the bundles and places them on a main platform of the load former (which is sometimes referred to in the art as a "cookie sheet"). The worker orients the bundles in a desired pattern as they are placed on the cookie sheet, and after a layer having a desired number and arrangement of bundles is formed, the load former is cycled to withdraw the cookie sheet to drop the layer onto a lift table beneath the cookie sheet. The lift table may support a pallet, and a first layer of bundles may be deposited onto the pallet by the withdrawn cookie sheet. The cookie sheet then re-extends above the deposited layer, and the worker forms a subsequent layer on the cookie sheet which will be deposited onto the top of the previously deposited layer in a subsequent step. This process is repeated until a stack of bundles having a predetermined height is formed at which point the pallet and stack of bundles is transported away from the load former for further processing and/or storage.

This procedure is reasonably efficient. However, the job of operating a load former is tedious and sometimes hard to fill, and efforts have therefore been made to automate the step of moving bundles from a location and arranging them on the cookie sheet of a load former. Two examples of systems that use conveyors to arrange bundles in a desired pattern before moving them to load former or otherwise forming a stack of those bundles are disclosed in U.S. Pat. No. 6,568,524 to Cornell and U.S. Pat. No. 5,540,545 to Roberts. However, the load forming systems of Cornell and Roberts systems can only be operated in a fully automated mode and do provide an option to allow a human worker to manually arrange bundles on a load former.

SUMMARY

A first aspect of the present disclosure is to provide a load forming system that can be used in either a worker-assisted mode in which a human worker moves bundles onto the cookie sheet of a load former and a fully automated mode in which bundles are moved onto the cookie sheet automatically. For example, for certain small runs of bundles it may be more efficient to use a human worker to arrange the bundles in a required pattern than to program a system to perform all the operations necessary to automatically load the load former. For larger runs, it may be more efficient to operate a load forming system in an automated mode, that is, without the need for a worker to manually place bundles onto the cookie sheet.

Another aspect of the disclosure comprises a load forming system that includes a feed conveyor having a discharge edge, a load former including a cookie sheet having an input edge at a front of the load former, and a transfer platform. The transfer platform has an upper surface, a first edge adjacent to the discharge edge of the feed conveyor and a second edge adjacent to the input edge of the load former. The system also includes a shifter comprising a contact body and an actuator, the actuator being configured to move the contact body and an object in contact with the contact body over the upper surface of the transfer platform toward the load former and to shift the contact body away from the load former. The shifter has an enabled state in which movement of the contact body over the upper surface of the transfer platform is permitted and a disabled state in which movement of the contact body over the upper surface of the transfer platform is prevented. The transfer platform includes a first section having an upper surface and a first edge perpendicular to the second edge of the transfer platform and a second section having an upper surface and a first edge adjacent to the first edge of the first section and a second edge spaced from the first edge of the first section. The second section is shiftable from a first position in which the upper surface of the second section is coplanar with the upper surface of the first section and a second position in which the upper surface of the second section is substantially perpendicular to the upper surface of the first section. The load forming system is shiftable between an automated configuration and a worker-assisted configuration. In the automated configuration, the second section is in the first position and the shifter is in the enabled state and a guard is mounted at the second edge of the second section to prevent an object on the transfer platform from sliding off the second edge of the second section, and in the worker-assisted configuration the second section is in the second position and the shifter is in the disabled state.

A method of using the above load forming system includes placing the load forming system into the automated configuration, moving a plurality of objects along the feed conveyor, and positioning a first set of the objects in a predetermined pattern at the discharge edge of the feed conveyor, the first set containing at least two of the objects. The method also includes transferring the first set of the objects, while they are arranged in the predetermined pattern, onto the transfer platform, operating the shifter to shift the first set of the objects arranged in the predetermined pattern off the transfer platform and onto the cookie sheet, and operating the shifter to shift the contact body away from the load former to a parked position. The method further includes placing the load forming system into the second configuration, transporting a second set of the objects along the feed conveyor toward the discharge edge of the feed conveyor, and without using the shifter, moving an individual object of the second set of the objects off the feed conveyor, across the upper surface of the first section of the transfer platform and onto the cookie sheet.

DETAILED DESCRIPTION

Figure 1:
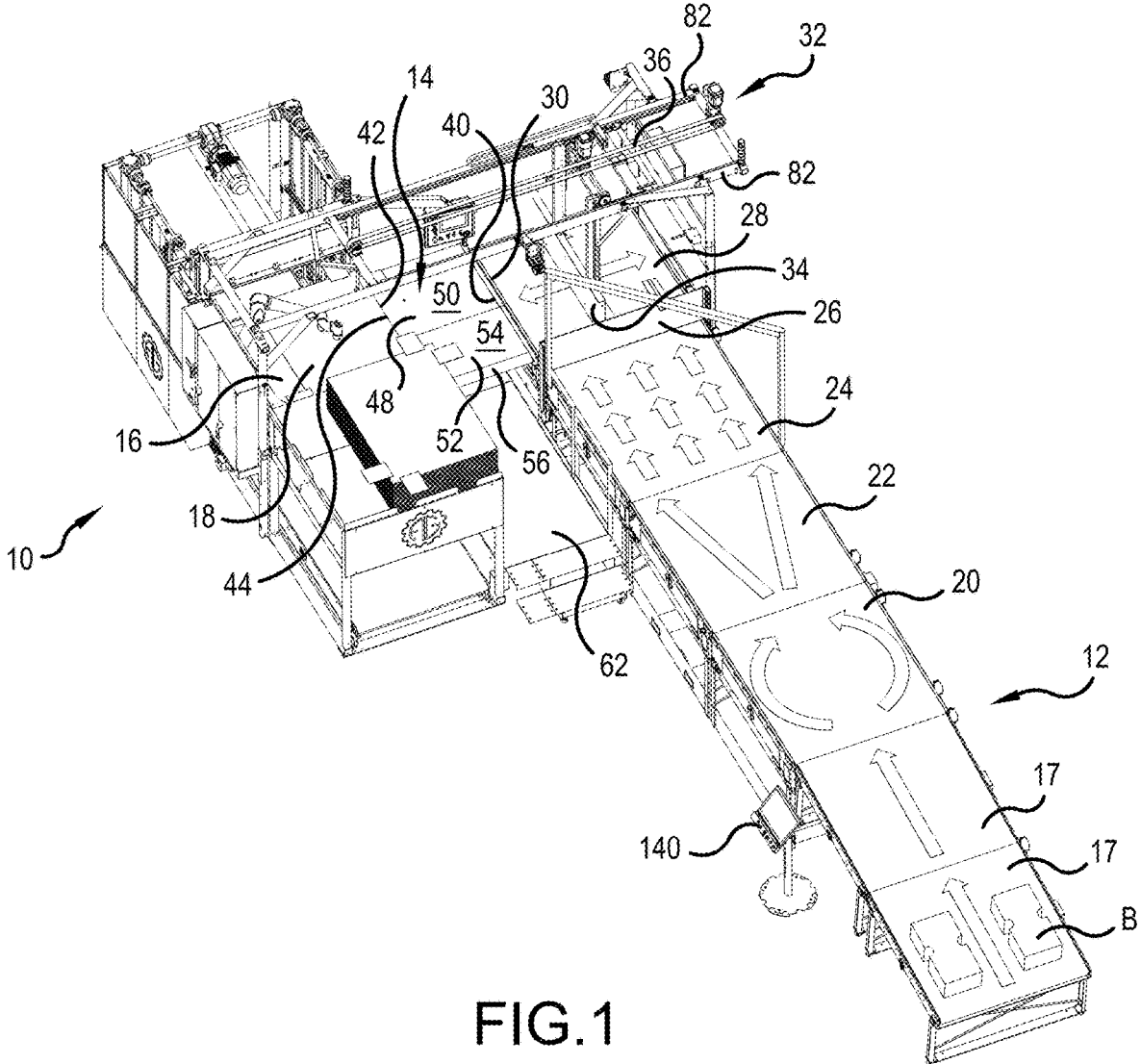
FIG. 1 is a perspective view of a load forming system having a feed conveyor, a transfer platform and a load former according to a first embodiment of the present disclosure with the system configured for automated operation.

Referring now to the drawings, wherein the showings are for purposes of illustrating presently preferred embodiments of the invention only and not for the purpose of limiting same, FIG. 1 shows a load forming system 10 that includes a feed conveyor 12, a transfer platform 14 and a load former 16 having a retractable cookie sheet 18. A direction along the feed conveyor 12 toward the load former 16 is referred to herein as a "downstream" direction.

The feed conveyor 12 is formed from a plurality of conveyor sections including two linear transport conveyor sections 17, a rotating conveyor section 20, a spreading conveyor section 22 and an accumulating conveyor section 24. The conveyor sections are operatable to shift and/or rotate individual bundles B (or small groups of bundles B) so that the bundles B arrive at the accumulating conveyor section 24 in a predetermined pattern that is suitable for placement onto the cookie sheet 18 of the load former 16 in the predetermined pattern. A gate 26, shown in a raised position in FIG. 1, stops further downstream movement of bundles B on the feed conveyor 12 and causes incoming bundles B to accumulate on the accumulating conveyor section 24 at the gate 26.

When the gate 26 is lowered, the bundles B, now arranged in a predetermined pattern, are moved onto an end conveyor 28 having a discharge edge 30. A shifter 32, including a contact body 34 and an actuating mechanism 36, discussed in more detail below, pushes the bundles B off the discharge edge 30 of the end conveyor 28 and over a first edge 40 of the transfer platform 14 onto the transfer platform 14 itself. Continued movement of the contact body 34 pushes the bundles over a second edge 42 of the transfer platform 14 and over an input edge 44 of the cookie sheet 18 onto the cookie sheet 18 itself. The shifter 32 then retracts the contact body 24, and the load former 16 cycles to process the layer of bundles in substantially the same manner as if a worker had placed the bundles individually onto the cookie sheet 18 in a conventional manner.

Figure 2:
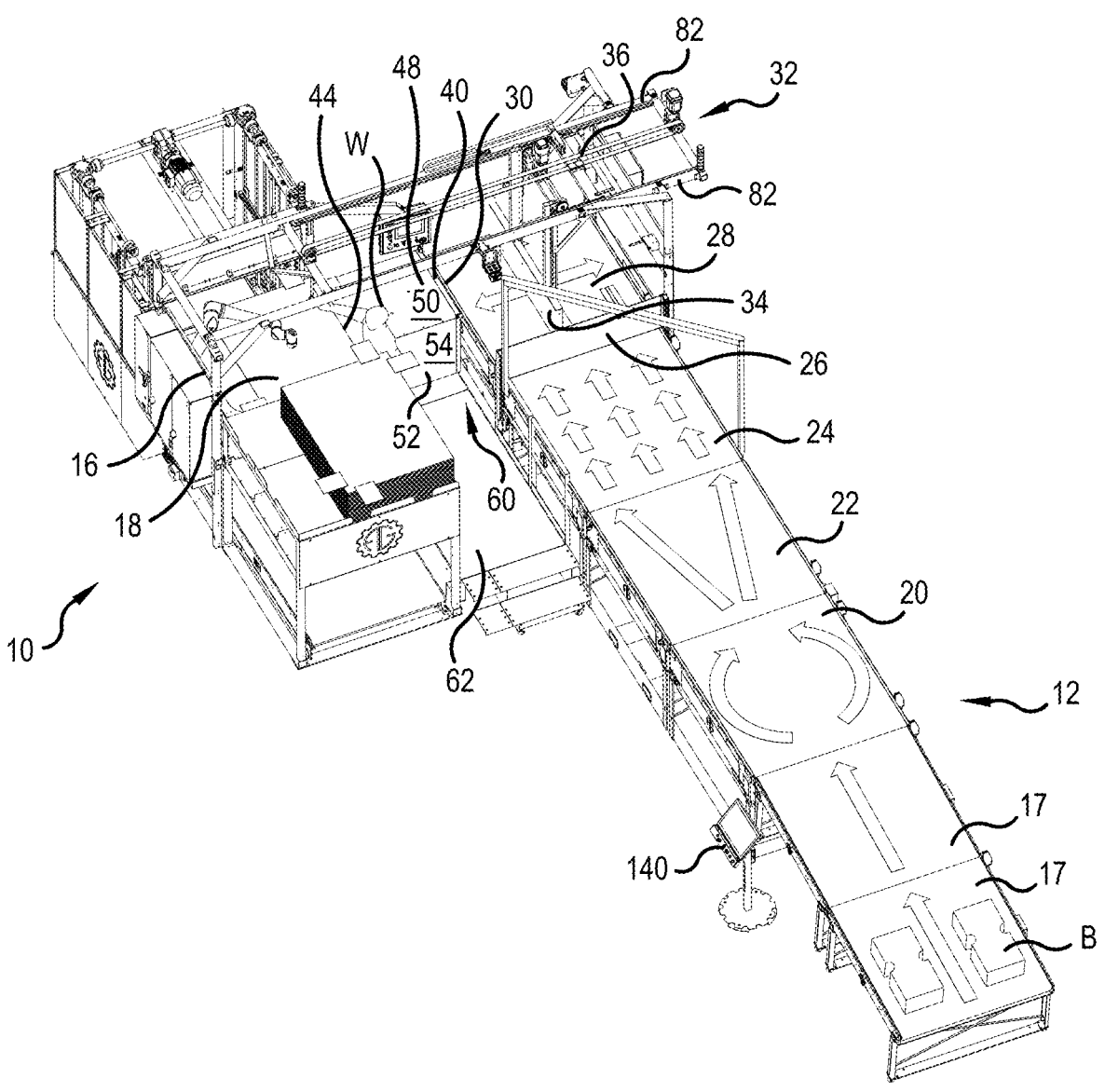
FIG. 2 is a perspective view of the load forming system of FIG. 1 configured for worker-assisted operation.

The transfer platform 14 has a first section 48 having a upper surface 50 and a second section 52 having an upper surface 54 hingedly connected to the first section 48 such that the second section 52 is shiftable between a first position, shown in FIG. 1, in which the upper surface 50 of the first section 48 and the upper surface 54 of the second section 52 are substantially coplanar, and a second position, shown in FIG. 2, in which the second section 52 is lowered such that the upper surface 54 of the second section 52 is substantially perpendicular to the upper surface 50 of the first section 48. When the second section 52 is in the first position, a guard 56 is mounted at the free end 58 of the second section 52 to help guide bundles across the transfer platform 14.

The upper surfaces 50, 54 of the first and second sections 48, 52 are smooth to facilitate the sliding movement of bundles thereacross. The upper surface 48 may be formed from, for example, stainless steel. Alternately, to reduce friction, the first section 48 and/or second section 52 of the transfer platform 14 may comprise an air table which emits jets of air from an internal pressurized plenum reduce the weight of the bundles B against the upper surfaces 50 (and optionally 54) to allow the bundles B to be moved across the transfer platform 14 with less frictional resistance. As a further alternative, the transfer platform 14 may be formed as an air-table conveyor 210 discussed in greater detail hereinafter.

An air table is a device that emits jets of air from a horizontal surface in order to support an object located on the air table on a thin cushion of air. A common example of an air table is an air hockey game that uses jets of air to support a puck on a playing surface so that the puck moves in an essentially frictionless manner in any direction over the surface. Commercial air tables function in a similar manner to support loads, especially those having relatively large bottom surface and relative low overall weight. An air table may be placed at the end of a conveyor for receiving objects transported to the air table by a conveyor. For example, a conveyor may discharge loads onto an air table at which point a human operator can slide the load along the air table to a final destination at one side or the other of the air table or perform some other operation on the load which requires the load to be rotated or shifted by the operator. The greatly reduced friction provided by the air table makes the load easier for the operator to move. Importantly, the objects may not be made to float like the puck of an air hockey table as this can make movement of the objects difficult to control. Instead, the air table may reduce the apparent weight of the objects to reduce the force required to move them across the air table surface.

FIG. 2 shows the second section 52 of the transfer platform 14 in the second position. When the second section 52 is in the second position, the load forming system 10 is configured to allow a worker W to manually shift bundles B from the end conveyor 28 to the cookie sheet 18 of the load former 16. To accommodate the worker W, a workspace 60 extends to a location between the end conveyor 28 and the load former 16. The workspace 60 is bounded on its bottom side by a worker platform 62, on a first side by the upper surface 54 of the second platform 52 in the second position, on a second side by the front of the load former 16 and on a third side by a portion of the end conveyor 28. Notably, a portion of the workspace 60 is located between the contact body 34 of the shifter 32 and the load former 16 in a location that is inaccessible to the worker W due to the presence of the guard 56 when the load forming system 10 is configured for automated operation. However, the guard 56 is configured to be readily removed or repositioned in manner that allows the worker W access to the full workspace 60 when the load forming system 10 is configured for semi-automatic operation with a worker W.

The worker W standing in the workspace 60 can manually remove individual bundles B from the end conveyor 28, slide the bundles B over the upper surface 50 of the first section 48 of the transfer platform 14 and place the bundles B onto the cookie sheet 18 of the load former 16 in a desired orientation. When the load forming system 10 is operated in this semi-automatic manner, bundles B may arrive at the end conveyor 28 one at a time rather than in a prearranged pattern suitable for sliding as a unit onto the load former 16. That is, the worker W and not the various sections of the feed conveyor 12 will arrange the bundles in a desired pattern on the cookie sheet 18.

Importantly, operation of the shifter 32 is enabled in the automated system configuration of FIG. 1 and disabled in the worker-assisted configuration of FIG. 2. This is because in the worker-assisted configuration, a worker W must stand between the contact body 34 and the load former 16 and could be injured by movement of the contact body 34 if it moves. The disabling may be carried out by a controller 140 or by a pin or other physical structure securing the contact body 34 or part of the shifter 32 to a fixed structure in a manner that prevents movement of the contact body 34. For example, a sensor (not illustrated) may monitor for the presence of the guard 56, and the controller 140 may keep the shifter in the disabled state at all times when the guard 56 is not present. The controller 140 may comprise, for example, a microprocessor or a computer processor having a CPU, an application-specific integrated circuit (ASIC), an integrated circuit (IC), or a suitably programmed general purpose computer.

Figure 3:
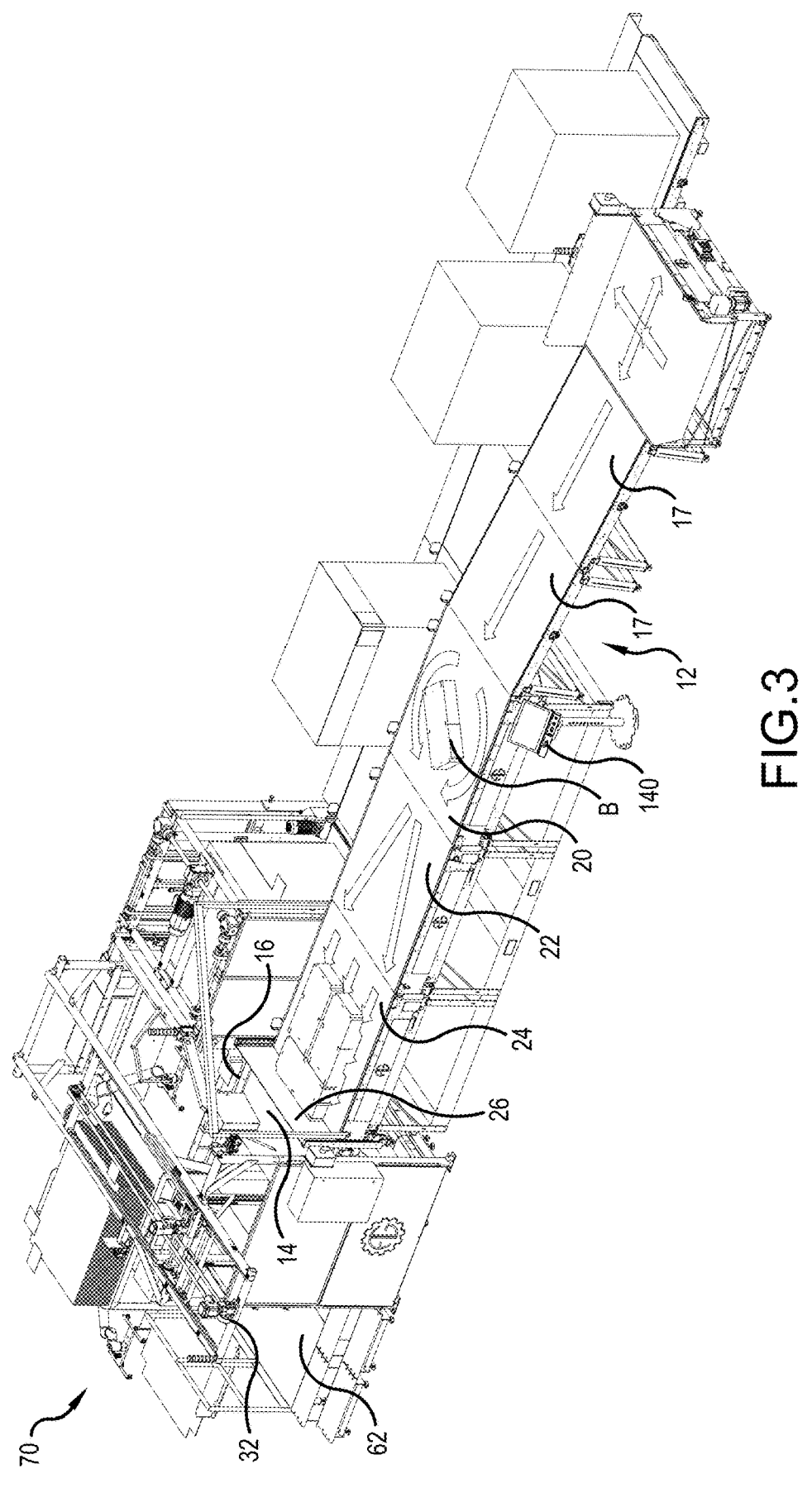
FIG. 3 is a perspective view of a load forming system having a feed conveyor, a transfer platform and a load former according to a second embodiment of the present disclosure looking toward the load former in a downstream direction.
Figure 4:
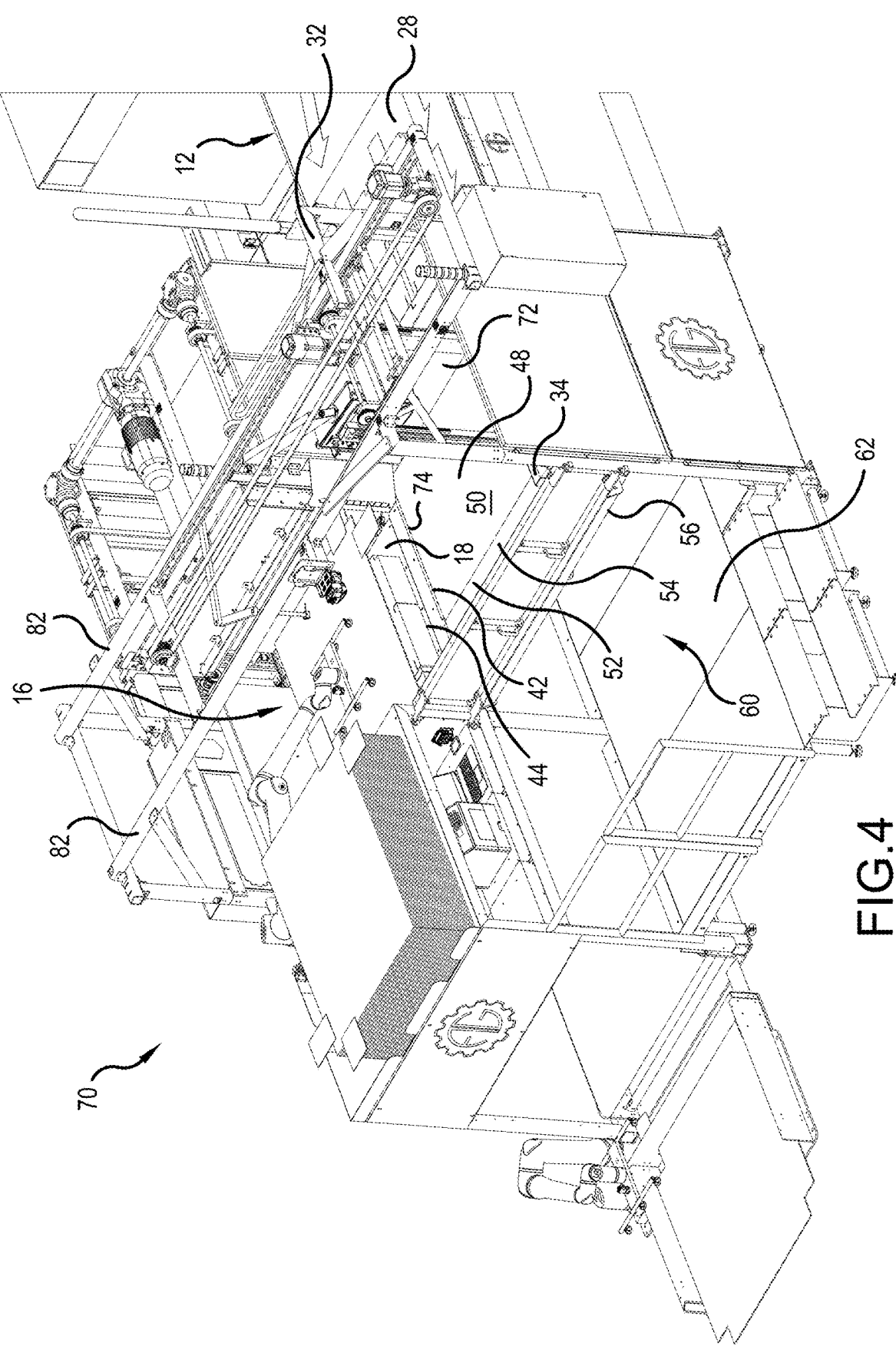
FIG. 4 is a perspective view of the load forming system of FIG. 3 configured for automated operation.
Figure 5:
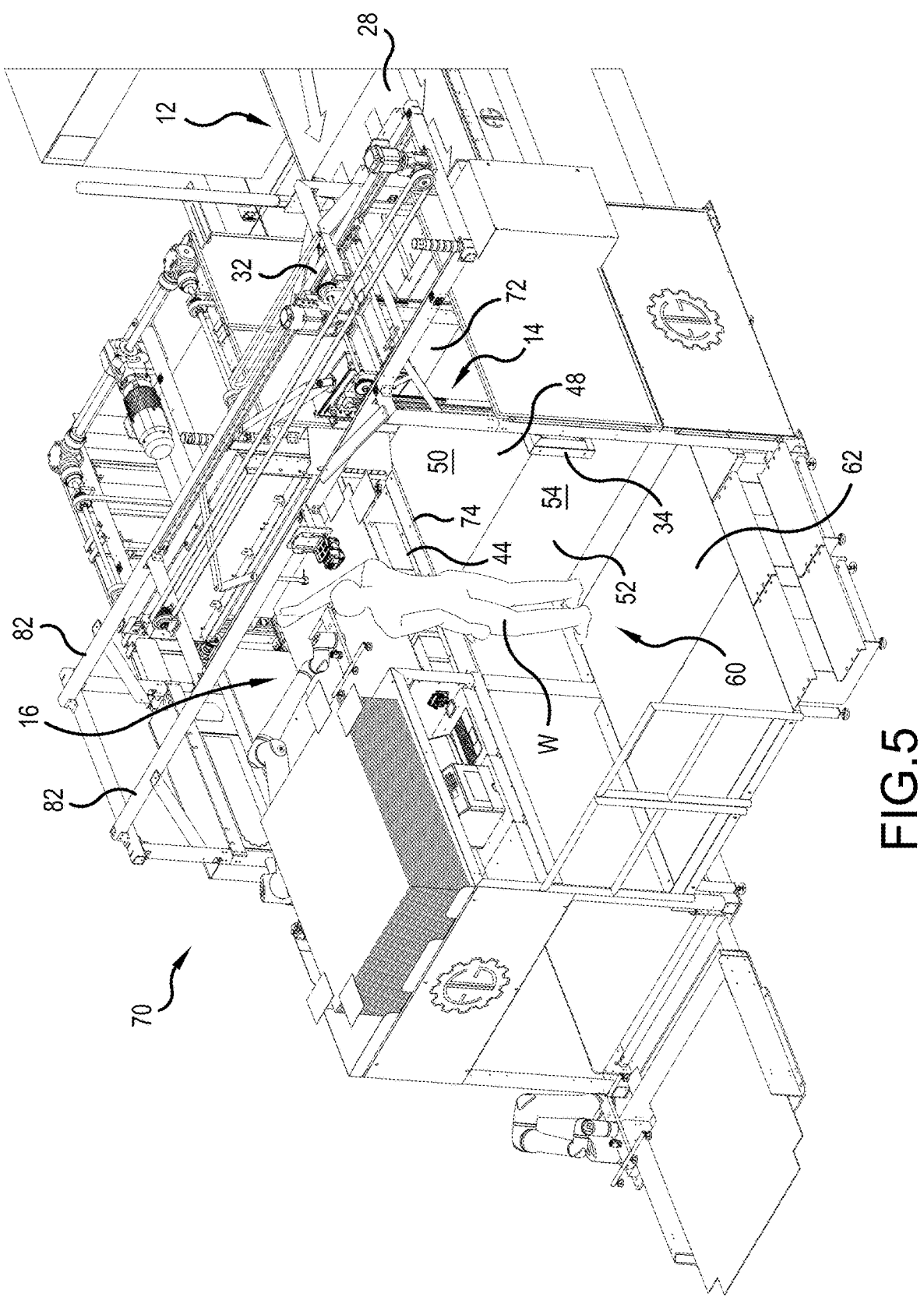
FIG. 5 is a perspective view of the load forming system of FIG. 3 configured for worker-assisted operation.

In the load forming system 10 of FIGS. 1 and 2, the feed conveyor 12 is located on the same side of the transfer platform 14 as the worker platform 62. FIGS. 3-5 show a second embodiment of a load forming system 70 in which the feed conveyor 12 is located on the opposite side of the transfer platform 14 from the worker platform 62. Elements common to both embodiments are identified with the same reference numerals.

In the load forming system 70, the feed conveyor 12 has a discharge edge 72 that is perpendicular to the input edge 44 of the cookie sheet 18. The first edge 74 of the transfer platform 14 is also perpendicular to the input edge 44 of the cookie sheet 18. When the gate 26 is lowered, bundles, arranged in a desired pattern, are pushed onto the transfer platform 14 by the end conveyor 28.

Like the load forming system 10 discussed above, the transfer platform 14 of the load forming system 70 could have a smooth upper surface or be formed as an air table. However, in this configuration (with the feed conveyor 12 on the opposite side of the transfer platform 14 from the workspace 60), it is desirable for at least the first section 48 of the transfer platform 14 to include a conveyor to help move a patterned layer of bundles B into a desired position in front of the contact body 34 from which position the patterned layer of bundles B can be shifted onto the cookie sheet 18 by the shifter 32. Furthermore, to reduce friction between the transfer platform 14 and the bundles, it is preferably to use an air table conveyor 210 of the type discussed below as the transfer platform 14 in this embodiment.

Figure 6:
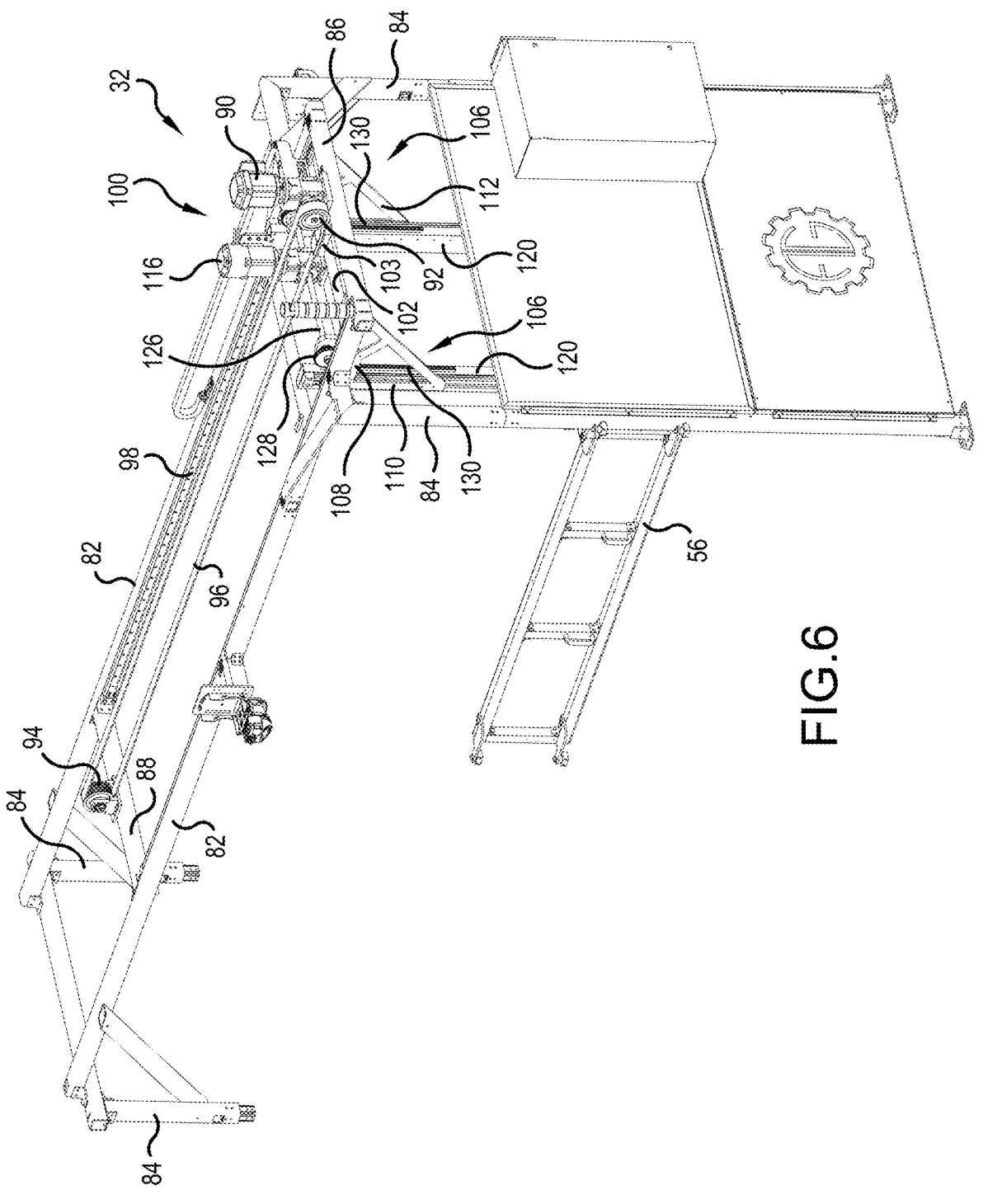
FIG. 6 is a first perspective view of a shifting mechanism usable in a load forming system according to embodiments of the present disclosure.
Figure 7:
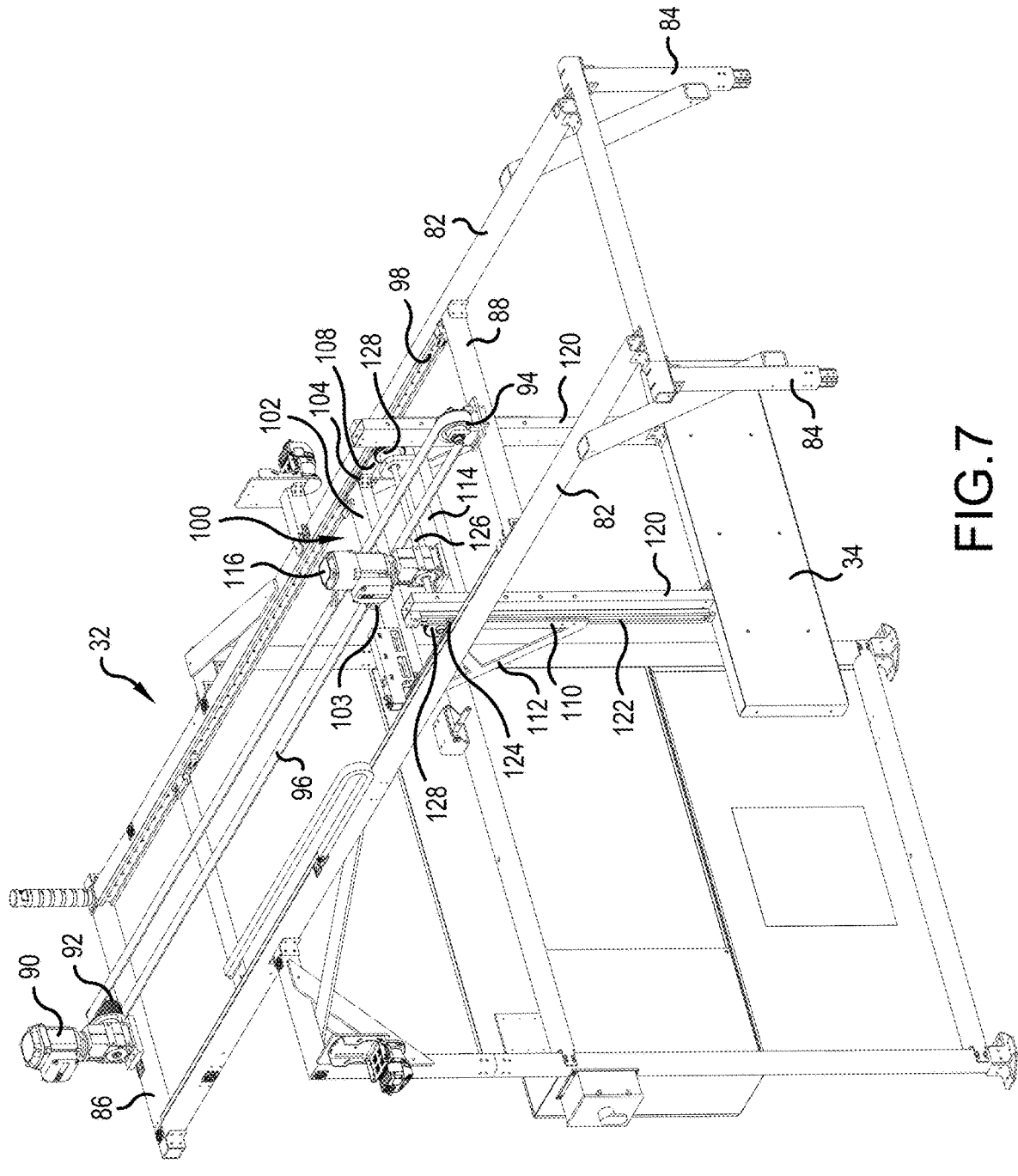
FIG. 7 is a second perspective view of the shifting mechanism of FIG. 7.

FIGS. 6 and 7 show the shifter 32 in greater detail. The shifter 32 includes a two horizontal rails 82 that extend above the end conveyor 28, the transfer platform 14 and the load former 16 in the load former system 10 of FIGS. 1 and 2, and above the transfer platform 14 and the load former 16 in the load former system of FIGS. 3-5. The rails 82 are connected by a first horizontal member 86 and a second horizontal member 88. A belt drive 90 is mounted on the first horizontal member 86 and is operably connected to a drive wheel 92; a second wheel 94 is mounted on the second horizontal member 88, and a belt 96 is supported by the drive wheel 92 and the second wheel 94 such that it can be driven in forward and reverse directions by the belt drive 90. The belt 96, for example, may include a plurality of inwardly facing teeth that engage with corresponding teeth on the drive wheel 92 and the second wheel 94 so that the belt 96 can be driven without slippage.

A C-channel 98 is mounted on each of the mutually inwardly facing sides of the rails 82, and a carriage 100, which supports the contact body 34 as discussed below, is supported by the rails 82 for movement along the rails 82. The carriage 100 includes a main frame member 102 connected between bearing elements 104 that are slidably mounted in the C-channels 98. The carriage 100 is movable from a first position in which the contact body 34 is located on a side of the transfer platform 14 opposite the load former 16, shown for example, in FIG. 4, where it does not interfere with the movement of bundles B from the feed conveyor 12 to the load former 16, to a second position in which the contact body 34 is located near the input edge 44 of the cookie sheet 18. The belt 96 is clamped to the main frame member 102 by a block 103 so that the main frame member 102 and the carriage 100 can be slid toward and away from the load former 16 by the operation of the belt drive 90.

A truss 106 is attached to each end of the main frame member 102 and includes a horizontal leg 108 extending adjacent to each of the C-channels 98, a vertical leg 110 and a diagonal leg 112 connecting the vertical leg 110 to the horizontal leg 108. A motor support 114 also extends between the trusses 106 and supports a lift motor 116.

The contact body 34 is connected to the carriage 100 by two vertical arms 120, each of which includes a C-channel 122 (only one of which is visible in FIG. 7) facing toward the vertical legs 110 of the trusses 106. Projections 124 on the trusses 106 extend into the C-channels 122 to guide the vertical legs 110 for vertical movement. A drive shaft 126 is driven by the lift motor 128 and includes a pinion 128 at each end which pinions 128 engages a rack 130 on each of the vertical arms 120.

Figure 8:
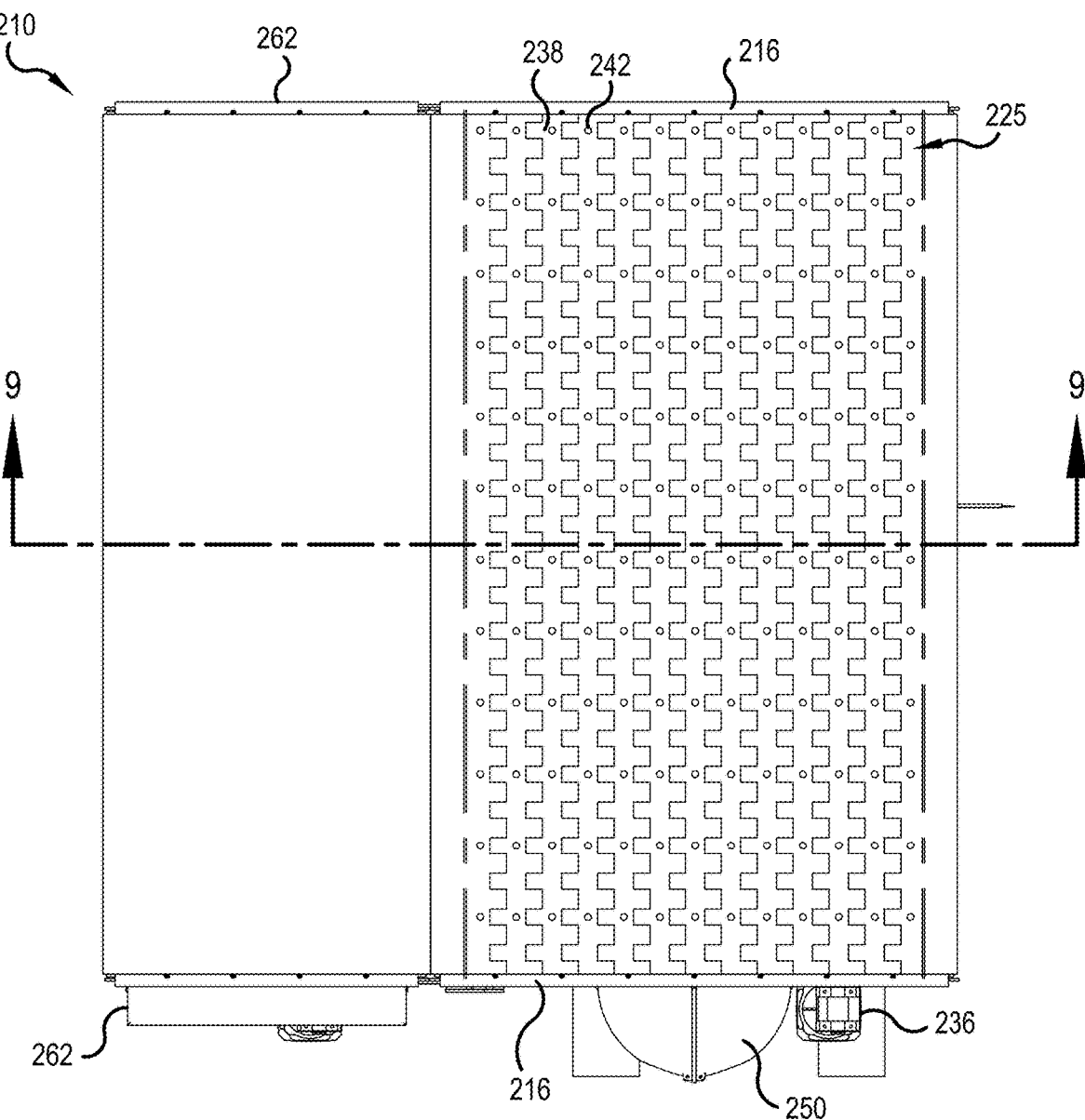
FIG. 8 is a top plan view of a first embodiment of an air table conveyor that can be used as the transfer platform of a load forming system according to embodiments of the present disclosure.
Figure 9:
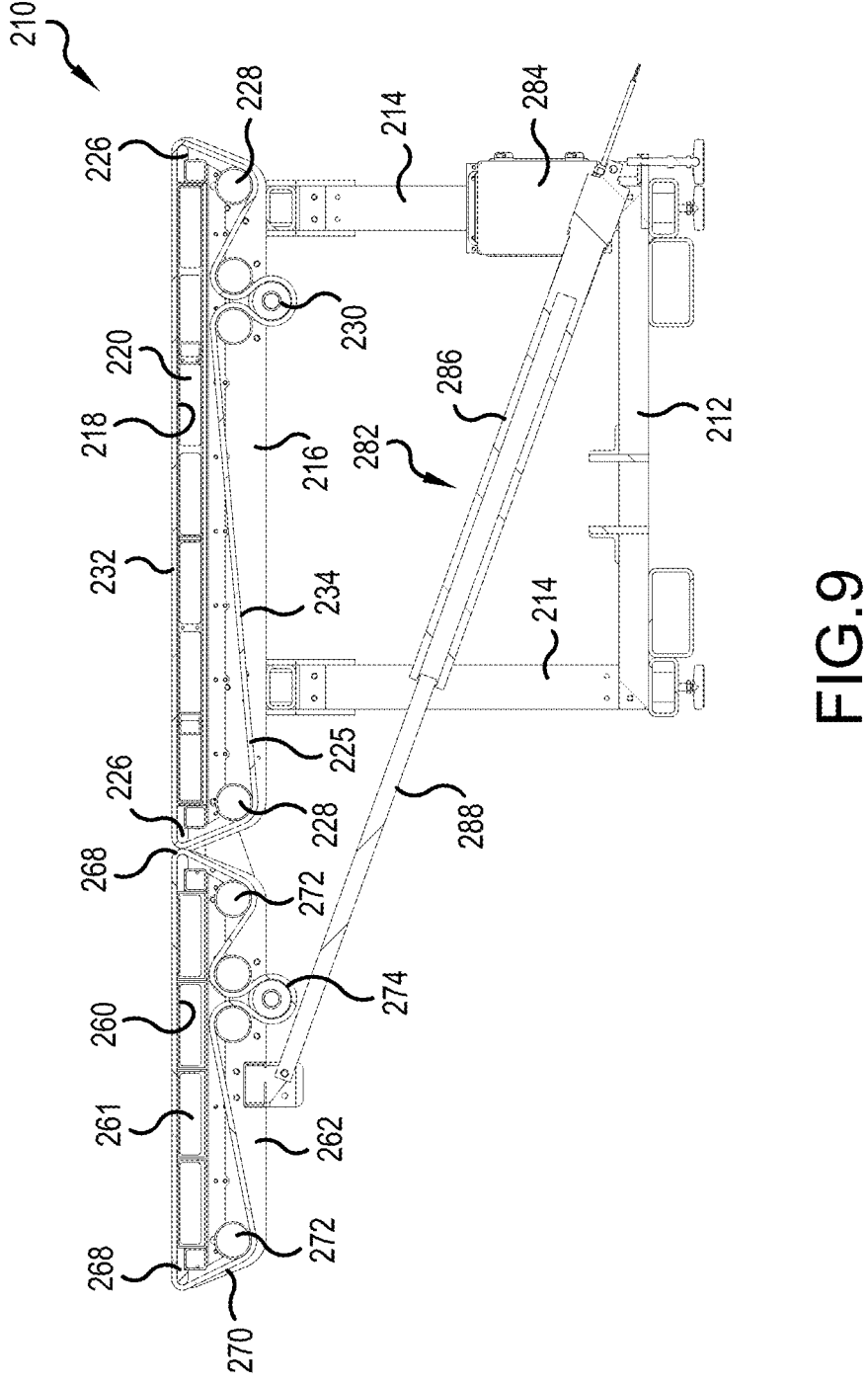
FIG. 9 is a sectional elevation view taken along line 9-9 in FIG. 8.
Figure 10:
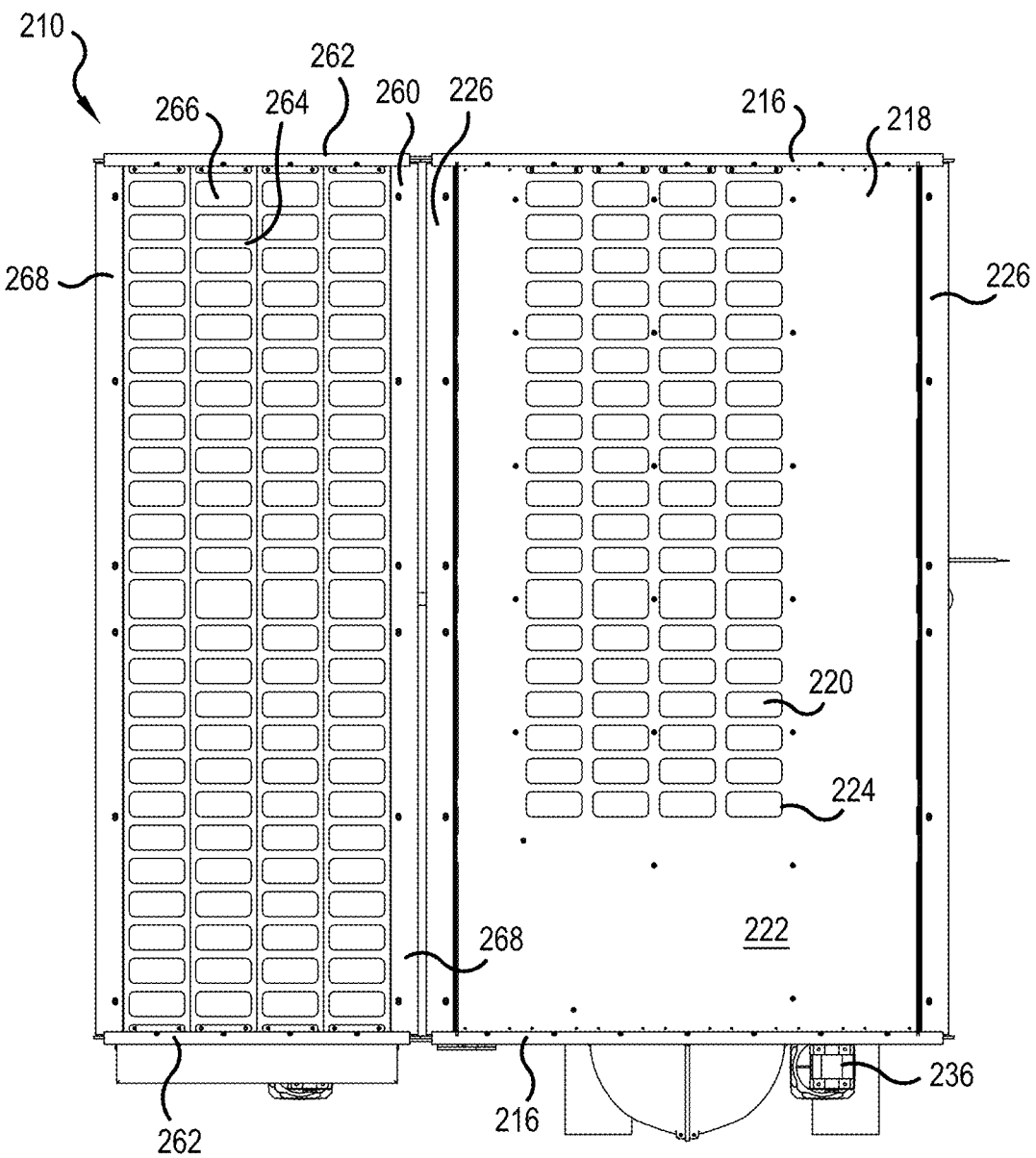
FIG. 10 is a top plan view of the conveyor of FIG. 8 with belts removed to show the structure of the support surfaces of the platform beneath the belt.

FIGS. 8-10 show a conveyor 210 suitable for use as the transfer platform 14 discussed above, especially in connection with the load forming system 70 of FIGS. 3-5. The conveyor 210 includes a frame 212 having vertical supports 214 and upper side supports 216. A first platform 218 is supported between the upper side supports 216 which platform 218 has a hollow interior 220 and an upper surface 222 having a plurality of holes 224 in fluid communication with the hollow interior 220.

As used herein, direction terms such as "upper," "lower," "above," and "below," refer to the orientation of the conveyor 210 shown in, e.g., FIG. 9, with the frame supported by a floor, the upper surface 222 extending substantially horizontally and the vertical supports 214 extending substantially vertically.

A segmented first belt 225 extends across the upper surface 222 of the first platform 218 and around radiused ends 226 of the first platform 218 to first and second end rollers 228 that extend between the upper side supports 216. The first belt 225 also extends around a drive roller 230 beneath the first platform 218 which drive roller 230 drives the first belt 225 around the first platform 218 and the end rollers 228. An upper run 232 of the first belt 225 is supported by the upper surface 222 of the first platform 218 and a lower run 234 of the first belt 225 guided beneath the first platform 218 by the end rollers 228 and the drive roller 230. A first belt drive 236 is operatively connected to the first drive roller 228 and is configured to rotate the first drive roller 228 to cause the first belt 225 to travel around the first platform 218.

Figure 15:
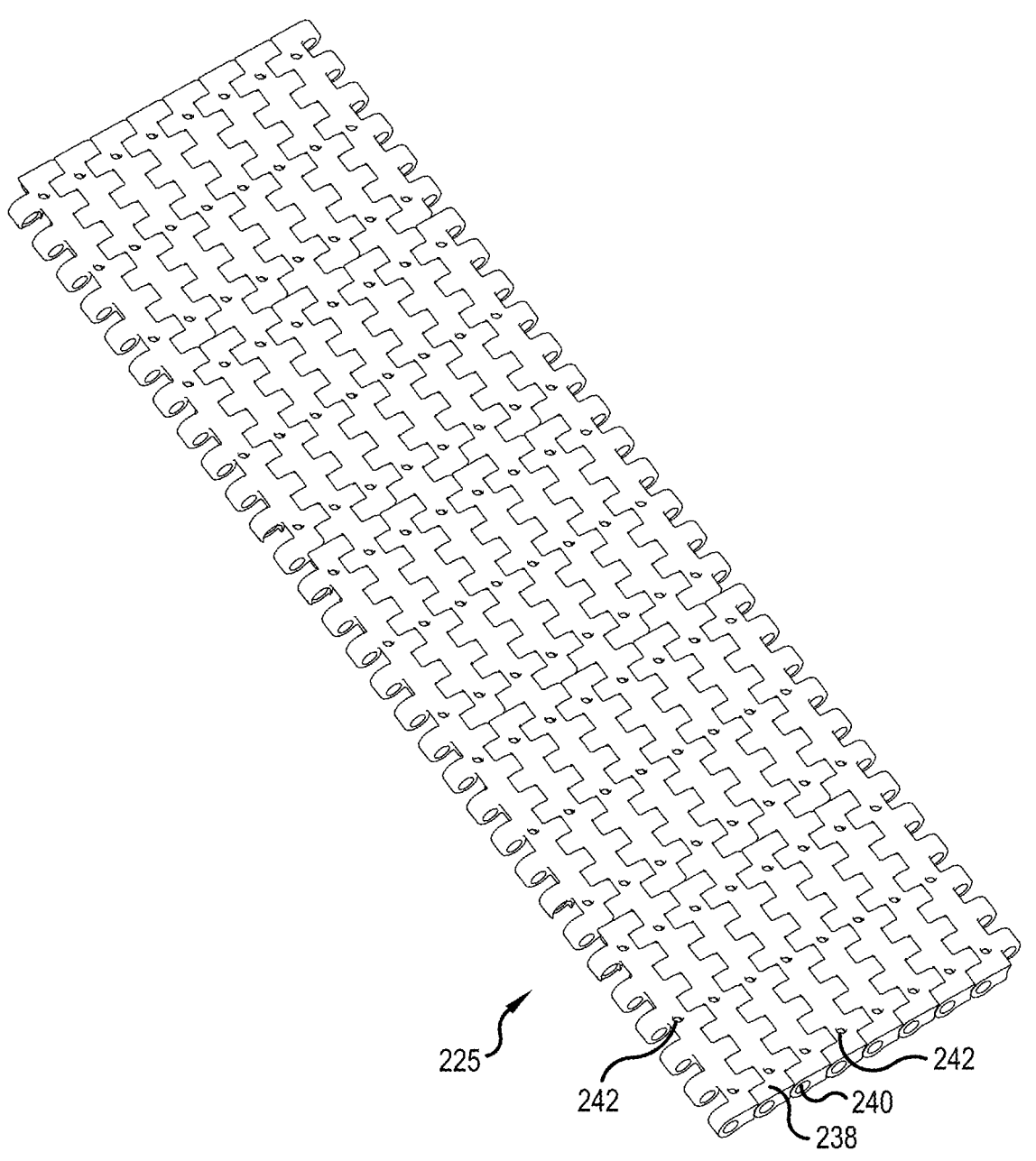
FIG. 15 is a perspective view of a section of the belt of the conveyor of FIG. 8.

The first belt 225, a section of which is shown in FIG. 15, includes a plurality of rigid sections 238 that are hingedly connected by pins 240 so that the first belt 225 can bend as it travels around the first platform 218, the end rollers 228 and the drive roller 230. The first belt 225 also includes a plurality of through openings 242 that allow air to exit the hollow interior 220 of the first platform 218 through the first belt 225. A suitable belt is available from Ammeraal Beltech of Skokie, IL under the series name uni M-QNB of belt type "vacuum."

The first platform 218 may be formed from upper and lower sheets of metal 244 with suitable supports 246 therebetween to provide structural support and allow the upper sheet of metal 244 to support loads during use of the conveyor 210 as discussed hereinafter. Other configurations of the first platform 218 are possible as long as the first platform 218 has one or more hollow interior chambers for receiving and guiding pressurized air to a plurality of holes in an upper surface of the first support and an upper surface suitable for guiding and supporting the first belt 225 and a load carried by the first belt 225.

The structure of the end rollers 228 and the drive roller 230 will depend on the nature of the first belt 225. In many cases, the "rollers" are actually shafts having sprockets mounted thereon for engaging corresponding openings in the interior of the first belt 225 to positively engage and drive the first belt 225. As used herein, the term "roller" refers to cylindrical rollers as well as to shafts having sprockets or shafts having pulleys of the type conventionally used to support one or more belts for movement along a closed path.

Figure 11:
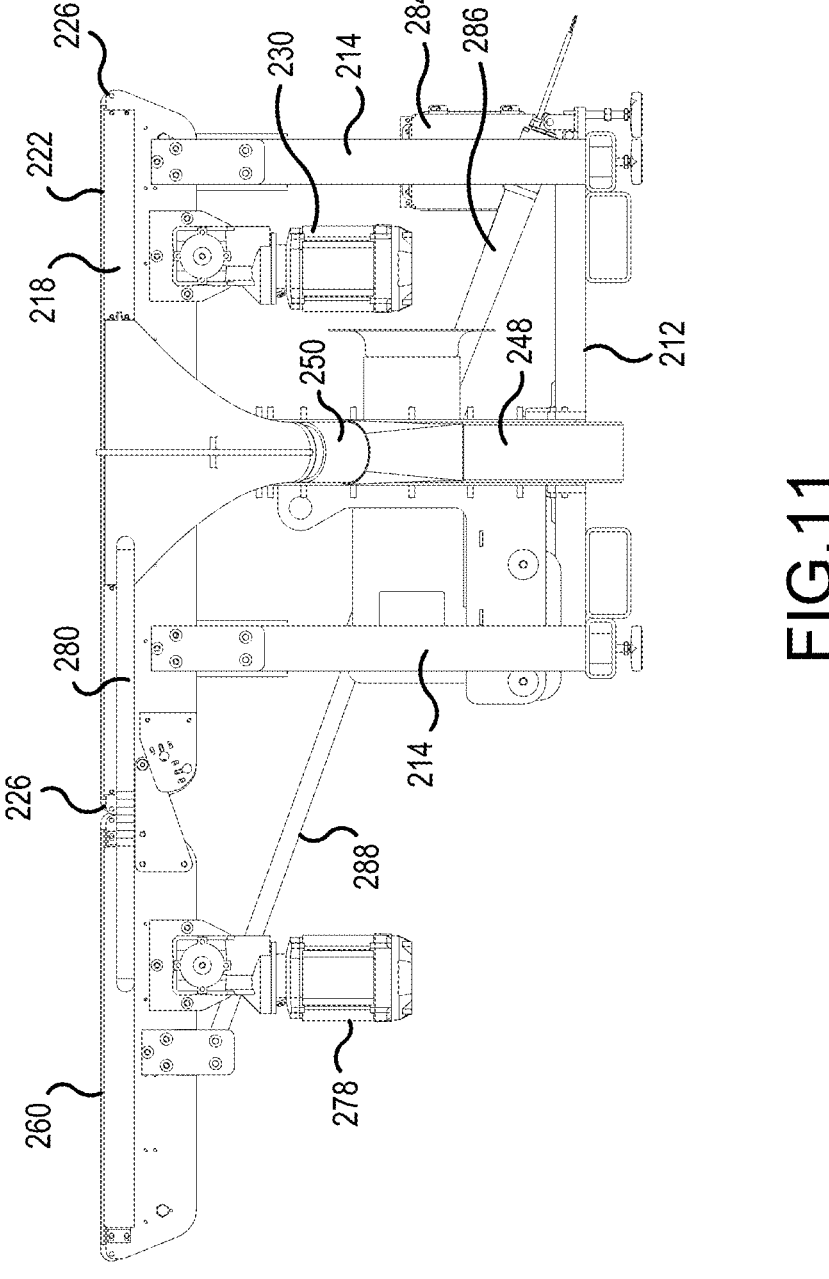
FIG. 11 is a side elevational view of the conveyor of FIG. 8.
Figure 12:
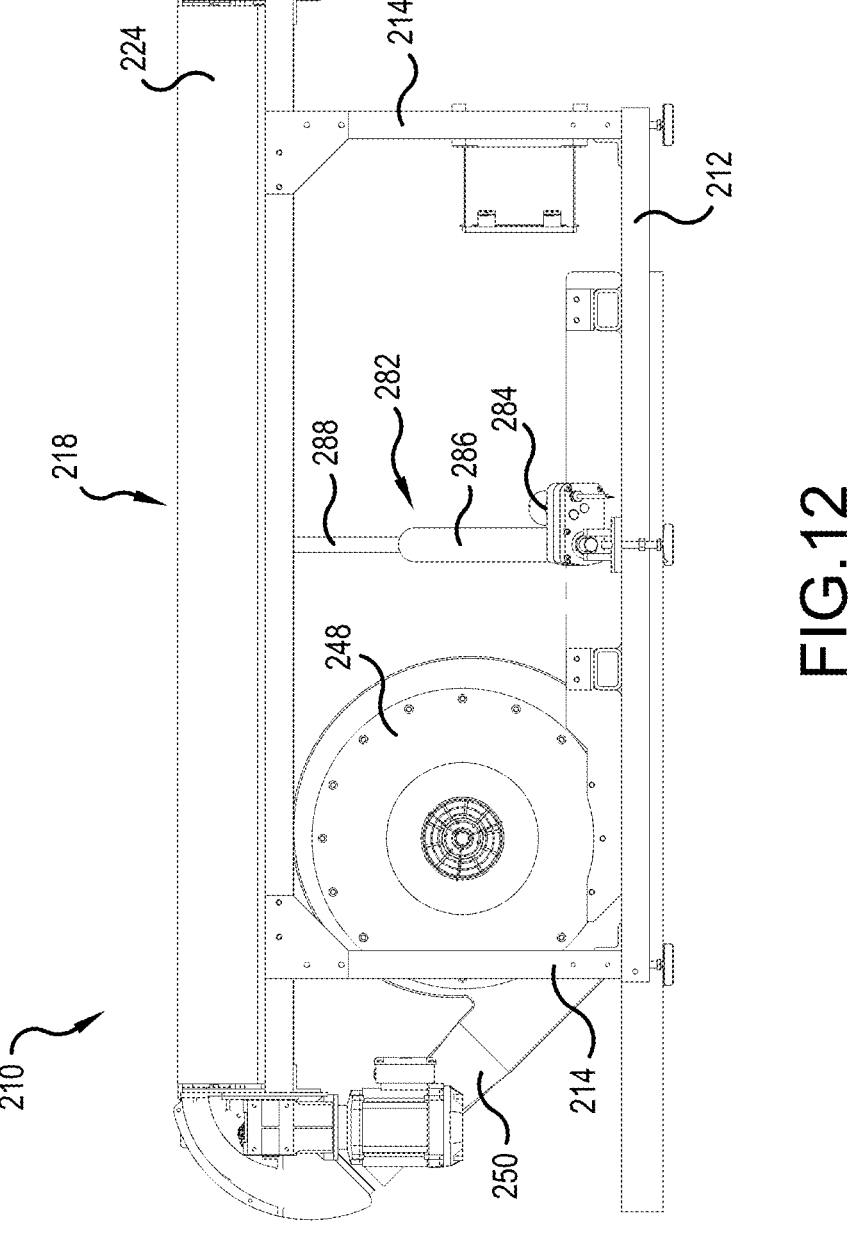
FIG. 12 is an end elevational view of the conveyor of FIG. 8.
Figure 13:
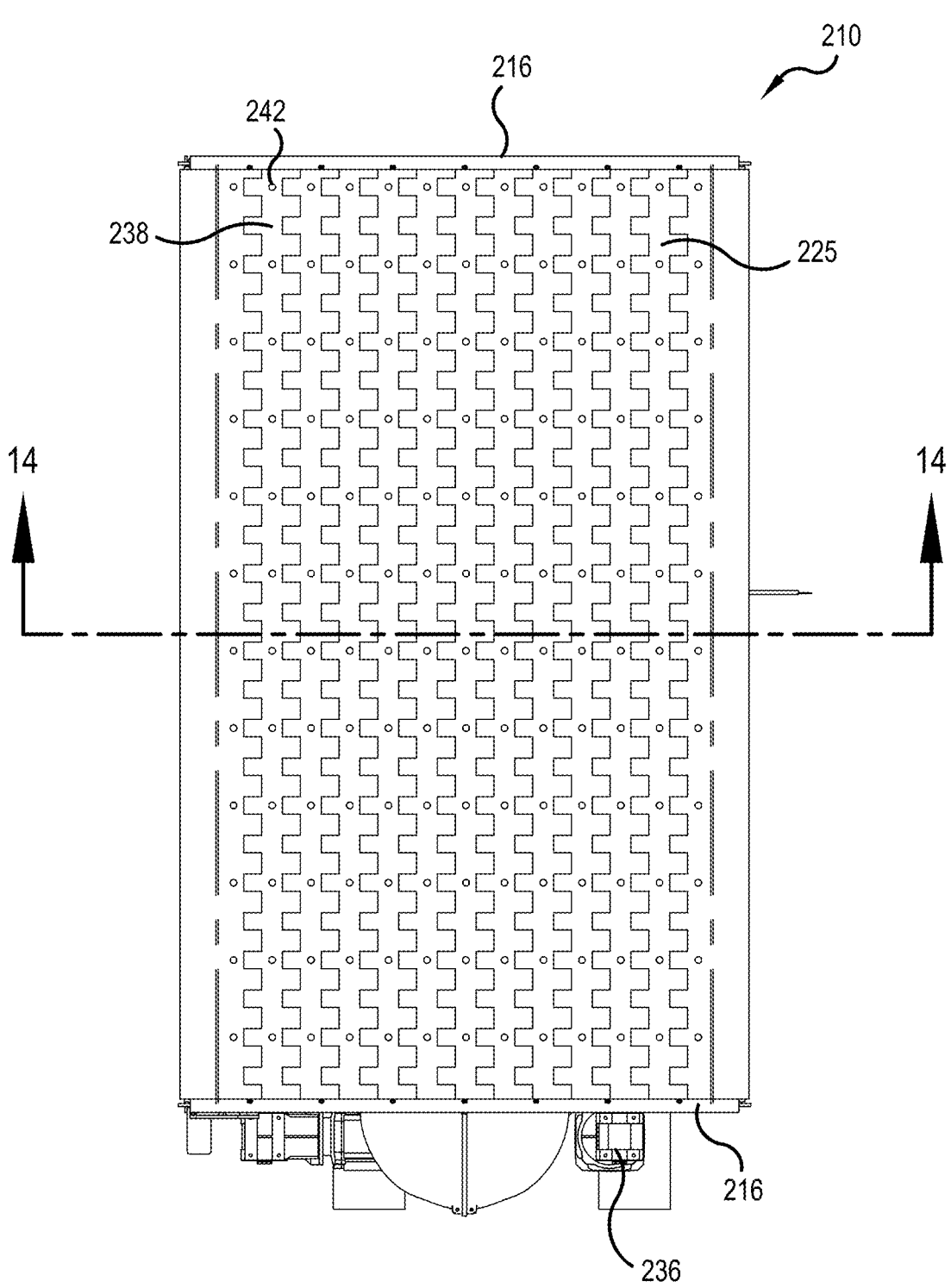
FIG. 13 is a top plan view of the conveyor of FIG. 8 with an extension portion of the conveyor in a lowered position.

A blower 248 (FIGS. 11 and 12) is connected to the hollow interior 220 by a duct 250 such that operating the blower 248 forces air into the hollow interior 220 and out of the plurality of holes 224 in the upper surface 222 of the first platform 218.

The first belt 225 overlies and blocks or substantially restricts air flow through the holes 224 in the upper surface 222 of the platform 218. While some air may leak out from under the edges of the first belt 225 or between the rigid sections 238, enough air will pass through the through-openings 242 in the first belt 225 to form jets of air extending upwardly from the upper run 232 of the first belt 225. Due to the restricted paths for air to escape from the hollow interior 220, the pressure in the hollow interior 220 is increased to a level above ambient by the blower 248. The air pressure in the hollow interior 220 is preferably maintained between about 1.5 inches of water column (iwc) and 5.0 iwc, during use and most preferably at about 2.5 iwc. This pressure level has been found to provide an adequate amount of lift for bundles B on the first belt 225 while at the same time not separating the first belt 225 from the upper surface 222 of the first platform to an excessive degree.

Each of the through-openings 242 has a cross-sectional area and each of the holes 224 has a cross-sectional area. Preferably, a sum of the cross sectional areas of the through-openings 242 in a portion of the upper run 232 of the first belt overlying the upper surface 222 of the first platform 218 is less than two percent, and more preferably less than one percent, of a sum of the cross sectional areas of the holes 224.

As shown in FIG. 10, in order to allow for the use of a smaller blower 248 and/or to limit air flow to the most frequently used portion of the first platform 218, the holes 224 may not cover the entire upper surface 222 of the first platform 218. In this manner, only a portion of the first platform 218 will provide a lift table function. For example, in the embodiment of FIG. 5, it is only necessary for the worker W to shift bundles from approximately the center of the first platform 218 toward the load former 16. Therefore, the holes 224 are not provided on the side of the first platform 218 opposite the load former 16. This is because the air table function may be most helpful to the worker W when the load forming system 10, 70 is operated in the worker-assisted configuration and not as necessary when bundles are moved across the first platform 218 by the shifter 32 in the automated configuration. Of course, in situations where it is necessary to move bundles off the first platform 18 in either direction, the entire upper surface 222 of the first platform 220 can be provided with the holes 224.

Figure 14:
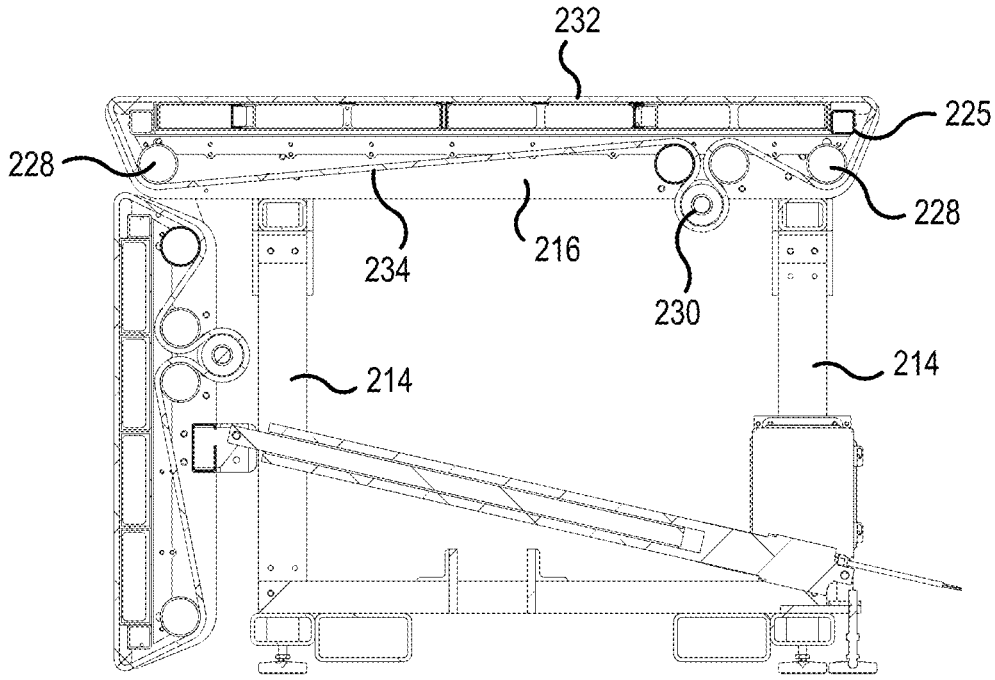
FIG. 14 is a sectional elevation view taken along line 14-14 in FIG. 13.

The conveyor 210 also includes a second platform 260 pivotably connected to one end of the first platform 218 that is shiftable between a raised position, as shown for example in FIG. 9, and a lowered position as shown, for example in FIG. 14. The second platform 260 is mounted between and supported by first and second side frame members 262. The second platform 260 is generally similar to the first platform and includes a hollow interior 261, an upper surface 264 having a plurality of holes 266 and radiused ends 268 configured to support sliding movement of a second belt 270 around the second platform 260 guided by first and second end rollers 272 and a drive roller 274 beneath the second platform 260. The second belt 270 includes a plurality of through openings 276, and a second drive 278 is operably connected to the drive roller 270.

A conduit 280 connects the duct 250, and thus the blower 248, to the interior 261 of the second platform 260 to pressurize the interior 216 of the second platform and form jets of air when air exits the holes 266 in the upper surface 264 of the second platform 260 and passes through the through openings 276 in the second belt 270.

In some cases, it may not be necessary to connect the second platform 260 to the blower 248. In those cases, the conduit 280 can be omitted, and the second belt 270 can be driven in the manner of a conventional conveyor without emitting jets of air. In a further alternative, the second platform could also omit the second belt 270 and the second drive 278 and function solely as a platform for receiving objects from the first belt 225 while the first platform 218 continues to provide an air table and/or conveyor functionality.

A telescoping actuator 282 is connected between the second platform 260 and the frame 212. The telescoping actuator includes a lift drive 284, a receiver 286 and an extendable member 288 that is extended from and retracted into the receiver 286 by the lift drive 284. Extending and retracting the extendable member 288 raises and lowers the second platform 260 relative to the first platform 218.

The operation of the load forming system 10 of FIGS. 1 and 2 when the transfer platform 14 comprises the air table conveyor 210 will now be described.

Bundles B arrive on the feed conveyor 12 from the output of a bundle breaker (not illustrated) or an upstream conveyor (not illustrated). The bundles B are moved downstream by the transport conveyor sections 17, rotated into a desired orientation by the rotating conveyor section 20, shifted laterally by the spreading conveyor section 22 and moved further downstream by the accumulating conveyor 24 until downstream movement is stopped when the bundles B impact against the gate 26 or against other bundles B that have previously come into contact with the gate 26. This may result in the pattern of bundles B in contact with the gate 26 as shown in FIG. 3.

When the desired arrangement of bundles B has been formed on the accumulating conveyor section 24, the gate 26 is lowered and the bundles B in the desired pattern are moved by the accumulating conveyor section 24 onto the end conveyor 28. The gate 26 is then raised, and the shifter 32 is actuated to move the contact body 34 into contact with the bundles B and slide the bundles B off the discharge edge 30 of the end conveyor 28 and onto the transfer platform 14.

Actuating the shifter 32 comprises operating the belt drive 90 to move the belt 96 to pull the carriage 100 along the rails 82 in the direction of the load former 16. Continued movement of the contact body 34 pushes the bundles B, still in the desired pattern, across the input edge 44 of the load former 16 and into position on the cookie sheet 18 of the load former 16. The load former 16 then cycles in a conventional manner, namely, the same way it would function if a human worker had placed the bundles in position on the cookie sheet 18.

After the contact body 34 arrives at the input edge 44 of the load former 16, the lift motor 116 is operated to rotate the drive shaft 126 and the pinions 128 at the ends thereof to lift the arms 120 and thus the contact body 34 away from the transfer platform 14. With the contact body 34 in a raised position, the belt drive 90 operates in a second direction to move the belt 96 to pull the contact body 34 away from the load former 16 and back to a starting or parked position out of the way of objects on the end conveyor 28. Raising the contact body 34 allows the contact body 34 to pass over any additional bundles B that have arrived on the end conveyor 28 while previous bundles B were being pushed onto the cookie sheet 18. The lift drive 126 is then operated to lower the contact body 34 back to a level in contact with or slightly above the end conveyor 28 so that it is ready to push the next layer of bundles B toward the load former 16.

When it is desired to operate the load forming system 10 of FIGS. 1 and 2 in a worker-assisted manner, the guard 56 is removed, and the second section 52 of the transfer platform 14 is lowered into its second position. This extends a workspace 60 to a location between the contact body 34 and the cookie sheet 18. Bundles B are then moved downstream along the feed conveyor 12 in a single line so that they can be grasped by the worker W, slid over the top surface 50 of the first section 48 of the transfer platform 14 by the worker W and into a desired position on the cookie sheet 18 of the load former 16. If the first section 48 of the transfer platform 14 comprises an air table, the air table function would be activated in this configuration to facilitate the movement of bundles B thereacross by the worker W. If the air table conveyor 210 of FIG. 8 is used as the transfer platform 14, the blower 248 could be operated to pressurize the interior 220 of the first platform 218 so that the air table conveyor 210 operates as an air table. The conveyor function of the air table conveyor 210 would not be needed in this configuration.

Operation of the load forming system 70 of FIGS. 3-5 is similar to the operation of the load forming system 10 of FIGS. 1 and 2 described above. However, when the gate 26 is lowered, the layer of bundles B leaves the end conveyor 28 over the discharge edge 72 and moves directly onto the transfer platform 14. In this embodiment, the transfer platform 14 preferably comprises the air table conveyor 210 of FIGS. 8-14, and the controller 140 also controls the first belt 225 and if present, the second belt 270 of the air table conveyor 210 (as well as all other motors and operational elements discussed herein) to carry the layer of bundles B into a desired position in front of the contact body 34 of the shifter 32. Thus, the shifter 32 is not required to shift the bundles onto the transfer platform 14 but only to move the bundles B already present on the transfer platform 14 off the transfer platform 14 and onto the cookie sheet 18 by the worker W.

To use the load forming system 70 in the worker-assisted configuration with a worker W, the guard 56 is removed and the second section 52 of the transfer platform 14, that is the second platform 260 of the air table conveyor 210, is shifted into a second or lowered position either manually or by operation of the lift drive 284 of the telescoping actuator 282 retracting the extendable member 288 into the receiver 286. In this configuration, the first belt 225 is driven by the first drive 236 to bring the bundles, for example one at a time, toward the worker W in the workspace 60 while the blower 248 pressurizes the interior 220 of the first platform 218 of the air table conveyor to force air out through the through openings 242 of the first belt 225 reduce the weight of the bundle B on the first belt 225, for example, by at least 50 percent, to facilitate the sliding of the bundles B across the first belt 225 and onto the cookie sheet 18.

It will be appreciated that when the air table conveyor 210 is used in a system like the load forming system 210 of FIGS. 3-5, it is not necessary to provide the air table function at the side of the transfer platform 14 furthest from the load former 16 because bundles will generally arrive at the transfer platform 14 from the center of the feed conveyor 12 (to reduce the distance they must be moved by the worker W). Thus, the holes 224 in the upper surface 222 of the first platform 218 may be arranged as shown in FIG. 10 such that they do not extend across the entire upper surface 222 of the first platform 218.

The present invention has been described above in terms of presently preferred embodiments. Modifications and additions to these embodiments will become apparent to persons of ordinary skill in the art upon a reading of the foregoing disclosure. It is intended that all such modifications and additions form a part of the present invention to the extent they fall within the scope of the several claims appended hereto.

What is claimed is:

1. A load forming system comprising:
a feed conveyor having a discharge edge;
a load former including a cookie sheet having an input edge at a front of the load former;
a transfer platform having an upper surface, a first edge adjacent to the discharge edge of the feed conveyor and a second edge adjacent to the input edge of the load former; and
a shifter comprising a contact body and an actuator, the actuator being configured to move the contact body and an object in contact with the contact body over the upper surface of the transfer platform toward the load former and to shift the contact body away from the load former, the shifter having an enabled state in which movement of the contact body over the upper surface of the transfer platform is permitted and a disabled state in which movement of the contact body over the upper surface of the transfer platform is prevented,
wherein the transfer platform includes a first section having an upper surface and a first edge perpendicular to the second edge of the transfer platform and a second section having an upper surface and a first edge adjacent to the first edge of the first section and a second edge spaced from the first edge of the first section, the second section being shiftable from a first position in which the upper surface of the second section is coplanar with the upper surface of the first section and a second position in which the upper surface of the second section is substantially perpendicular to the upper surface of the first section,
wherein the load forming system is shiftable between an automated configuration and a worker-assisted configuration,
wherein in the automated configuration the second section is in the first position and the shifter is in the enabled state and a guard is mounted at the second edge of the second section to prevent an object on the transfer platform from sliding off the second edge of the second section, and
wherein in the worker-assisted configuration the second section is in the second position and the shifter is in the disabled state.

2. The load forming system according to claim 1,
wherein the transfer platform includes at least one conveyor configured to receive a load from the discharge edge of the feed conveyor.

3. The load forming system according to claim 2,
wherein the transfer platform includes a hollow interior, wherein the upper surface of the first section has a plurality of holes, and wherein the at least one conveyor includes at least one belt having a plurality of through openings, the at least one belt being supported by the upper surface of the transfer platform.

4. The load forming system according to claim 2,
wherein the at least one conveyor comprises a first conveyor supported by the first section of the transfer platform and a second conveyor supported by the second section of the transfer platform.

5. The load forming system according to claim 1,
wherein the first section of the transfer platform comprises an air table.

6. The load forming system according to claim 1, further including:
a plurality of holes in the upper surface of the first section of the transfer platform, each of the plurality of holes being in fluid communication with at least one air passage inside the first section of the transfer platform;
a first belt having an upper run supported by the upper surface of the first section of the transfer platform and a lower run extending beneath the first section of the transfer platform, the first belt having a plurality of through openings overlying the first holes such that at least a portion of pressurized air exiting the at least one air passage through the first holes passes through the through openings in the first belt,
a drive for selectively causing the upper run of the first belt to travel along the upper surface of the first platform toward the load former, and
a blower in fluid communication with the at least one air passage and configured to blow air into the at least one air passage to maintain a pressure in the at least one air passage at a level above an ambient atmospheric pressure.

7. The load forming system according to claim 1,
including a workspace at the front of the load former, the workspace being delimited on a lower side by a worker platform, on a first side by the second section of the transfer platform in the second configuration, on a second side by a front of the load former and on a third side by a portion of the contact body.

8. The load forming system according to claim 7,
wherein the workspace is delimited on the third side by a portion of the feed conveyor.

9. The load forming system according to claim 1,
wherein the discharge edge of the feed conveyor is parallel to the input edge of the load former.

10. The load forming system according to claim 1,
wherein the discharge edge of the feed conveyor is perpendicular to the input edge of the load former.

11. The load forming system according to claim 1,
wherein the object is a bundle of die-cut paperboard blanks.

12. The load forming system according to claim 1,
wherein the shifter is configured to raise and lower the contact body relative to the transfer platform.

13. The load forming system according to claim 6,
including a workspace at the front of the load former, the workspace being delimited on a lower side by a worker platform, on a first side by the second section of the transfer platform in the second configuration, on a second side by a front of the load former and on a third side by a portion of the contact body,
wherein the object is a bundle of die-cut paperboard blanks, and
wherein the shifter is configured to raise and lower the contact body relative to the transfer platform.

14. A method comprising:

providing a load forming system according to claim 1, placing the load forming system into the automated configuration, moving a plurality of objects along the feed conveyor, positioning a first set of the objects in a predetermined pattern at the discharge edge of the feed conveyor, the first set containing at least two of the objects, transferring the first set of the objects arranged in the predetermined pattern onto the transfer platform, operating the shifter to shift the first set of the objects arranged in the predetermined pattern off the transfer platform and onto the cookie sheet, operating the shifter to shift the contact body away from the load former to a parked position, placing the load forming system into the second configuration, transporting a second set of the objects along the feed conveyor toward the discharge edge of the feed conveyor, and moving an individual object of the second set of the objects away from the contact body, across the upper surface of the first section of the transfer platform and onto the cookie sheet.

15. The method according to claim 14, wherein placing the load forming system into the second configuration includes removing the guard from the second section of the transfer conveyor.

16. The method according to claim 14, wherein the plurality of objects comprise a plurality of bundles of die-cut paperboard blanks.

17. The method according to claim 14, wherein operating the shifter to shift the contact body away from the load former to a parked position includes raising the contact body relative to the transfer platform.

* * * * *